Dec. 19, 1944.   J. A. HONEGGER   2,365,196
LATHE ATTACHMENT
Filed March 26, 1942
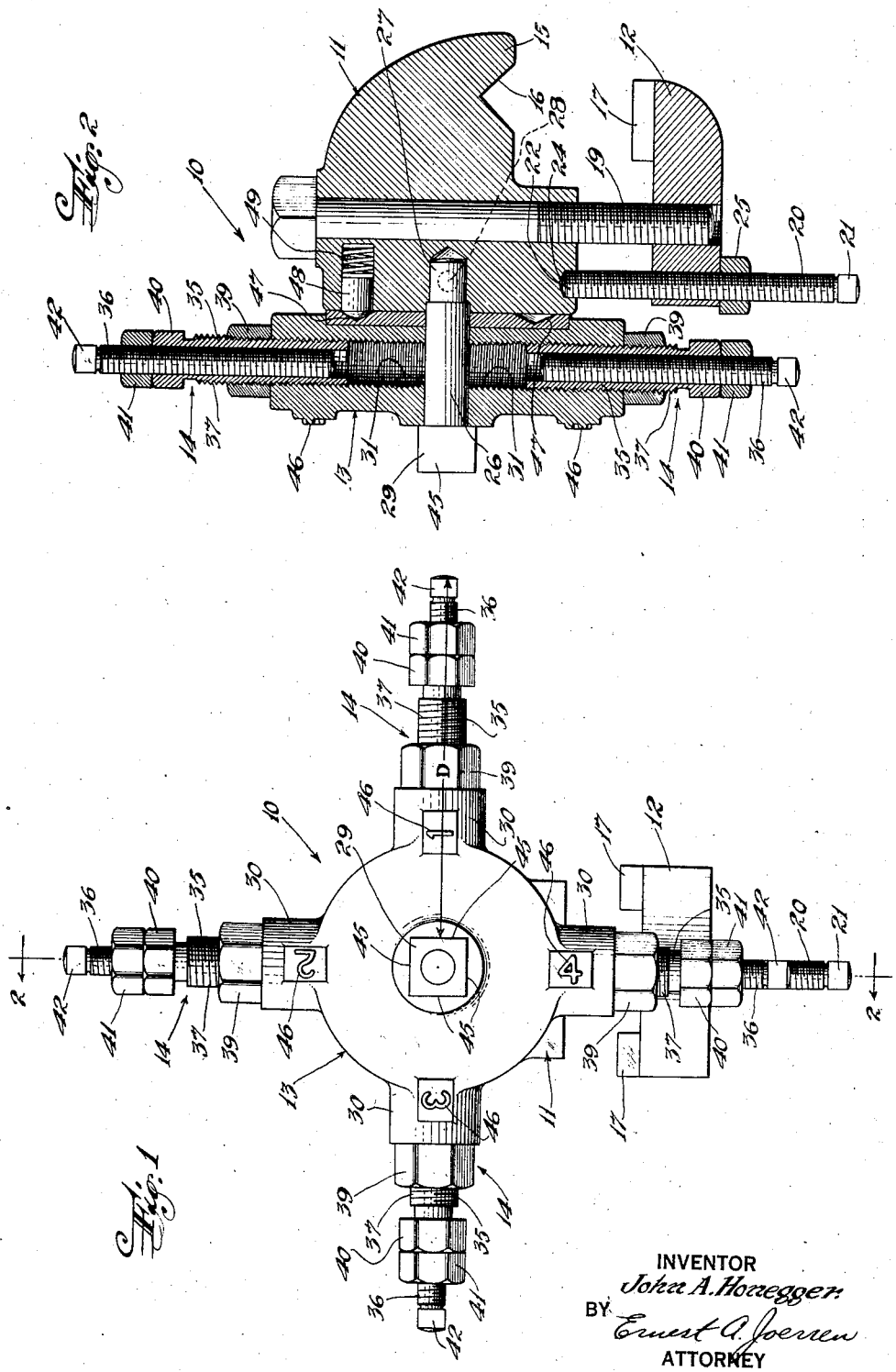
INVENTOR
John A. Honegger
BY
Ernest A. Joerren
ATTORNEY Patented Dec. 19, 1944

2,365,196

UNITED STATES PATENT OFFICE 2,365,196

LATHE ATTACHMENT

John A. Honegger, Bloomfield, N. J., assignor to Specialties Manufacturing Company, Inc., Bloomfield, N. J., a corporation of Delaware Application March 26, 1942, Serial No. 436,296

7 Claims. (Cl. 82—34)

The present invention relates to lathes, and more particularly to lathe attachments for selectively stopping a lathe carriage at a plurality of accurately predetermined points.

The attachment, in accordance with the present invention, is particularly adapted to be used in connection with metal working lathes such as manually operable screw cutting lathes of the bench or floor type, which comprise a bed, a carriage slidably supported on the bed for carrying the work or the tools, and a feeding screw for moving the carriage along the bed. The feeding screw usually is operated manually, but may be power driven. In the latter instance, the carriage is provided with a device for effecting disengagement of the feeding screw to render it ineffective when the carriage has been moved to a desired point along the bed.

An object of the present invention is to provide a simple, inexpensive attachment for lathes of the foregoing types, adapted to selectively stop the lathe carriage at a plurality or series of accurately predetermined points.

Another object is to provide an attachment for lathes, adapted to be adjusted to selectively stop the carriage at predetermined points over a substantial range.

Another object is to provide an attachment of the class described having a plurality or series of stops which may be rapidly and accurately adjusted, and may be selectively placed in carriage stopping position in a rapid and convenient manner.

Another object is to provide an attachment adapted to convert single purpose hand operated lathes into "multi-purpose" hand operated lathes.

Another object is to provide an attachment adapted to convert lathes normally requiring constant manual supervision into semi-automatic "multipurpose" lathes requiring very little manual supervision.

A further object consists in the construction and combination of parts of the attachment, whereby the foregoing objects may be accomplished.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

Figure 1 is a front elevational view of a stop attachment illustrating an embodiment of the invention.

Figure 2 is a sectional view taken substantially along the line 2—2 on Figure 1.

Referring to the drawing, there is shown a lathe attachment 10, in accordance with the present invention. In general, the attachment 10 comprises a body or upper clamping member 11, a lower clamping jaw 12, and a member 13, such as a rotatable turret member carrying a plurality or series of adjustable stops 14.

The body or upper clamping member 11 (Figure 2) is provided with a clamping jaw 15 having a downwardly facing recess 16 for receiving a lengthwise extending rib or ridge on the bed of a lathe. The lower clamping jaw 12 may be provided with one or more upwardly extending projections or ribs 17 adapted to fit into a lengthwise extending groove formed in the underside of the bed of the lathe. The lower clamping jaw 12 is connected to the body 11 by a screw or bolt 19 which extends downwardly through an aperture in the body 11 and through a threaded aperture in the lower jaw. A second screw or bolt 20, provided with a slotted lower end or a nut-shaped head 21, is threaded upwardly through the lower jaw, and the upper end 22 thereof is disposed in an opening 24 at the underside of the body. A lock nut 25, or the like, may be threaded on the screw 20 and positioned to abut the lower jaw to maintain the screw 20 in adjusted position. The foregoing described clamping arrangement enables the attachment to be readily secured and removed from the bed of the lathe and moved from one position to another along the bed.

The turret member 13, or the like, is rotatably mounted on the body 11 by a shaft, stud, or axle 26 extending through a central aperture or hub of the turret member. The inner end 27 of the stud 26 may be secured in an opening in one side of the body by a set screw 28, and the outer end of the stud may be provided with a fixed head 29 for retaining the turret member on the stud. The head 29 may be a nut threaded to the outer end of the stud and secured in a predetermined position by a suitable pin or the like. The stud extends laterally in a horizontal plane from the body and rotatably mounts the turret member in a position so that, when the clamping jaws 12 and 15 are secured to the bed of the lathe, the stops on the turret member are adapted to be placed in the path of the apron of the lathe carriage.

The turret member 13 may be a substantially circular disc-shaped member having a plurality or series of radially extending, equidistantly circumferentially spaced arms 30. For example, four arms, as shown herein, may be provided. The arms 30, preferably are tubular and are provided with a bore 31 which preferably is threaded and extends radially into the turret member for mounting the stops, about to be described.

The stops 14 each comprise a tubular sleeve 35 adapted to be mounted in telescoping relation in the bore 31 of the turret member, and a member, such as a rod 36, adapted to be mounted in telescoping relation in the tubular sleeve 35.

The sleeves 35 may be provided with threads 37 on the exterior thereof for cooperating with the threads of the bores 31 to screw the sleeves inwardly and outwardly into any desired position of adjustment. In order to maintain the sleeves 35 in their adjusted position, a lock nut 39, or the like, is threaded on each of the sleeves and is adapted to be forced against the free ends of the arms to hold the sleeves against accidental rotation and consequent movement in a radial direction. Preferably, the sleeves 35 have a head or nut-shaped portion 40 at their outer ends for preventing the lock nuts 39 from being unscrewed from the sleeves. The heads 40 are engageable by a wrench or the like to facilitate rotation of the sleeves during adjustment thereof.

The rods 36 may be threaded into the sleeves 35, and may be held in adjusted position by lock nuts 41 adapted to be forced against the free ends of the sleeves. The free or outer ends of the rods, preferably, have nut-shaped heads 42 which are engageable by a wrench and serve to prevent the locknuts 41 from being unscrewed. The heads 42 also serve as the means for contacting the carriage and effecting the stopping of the movement thereof.

If desired, the threads between the bores 31 and the sleeves 35 may have a predetermined pitch, while the threads between the sleeves 35 and the rods 36 may have a different pitch. For example, the former threads may have a pitch for adjusting the stops in large increments and the latter threads may have a pitch for adjusting the stops in smaller increments. With this arrangement, a vernier effect is obtained, whereby the stops can be quickly adjusted, with micrometer-like accuracy, in their desired outwardly projecting position.

In order to measure the distance the stops extend outwardly in relation to each other, the head or nut 29 is made substantially square and has four sides or faces 45 which are perpendicular to the respective longitudinal axes of the four stops. The distance D, as shown in Figure 1, between one of the faces and the contact end of the head 42 of a stop 14 in line with the face can be accurately measured by placing the zero end of a small scale against the face and reading the distance on the scale at the contact end of the head. In this manner, the faces serve as index means.

If desired, each of the stops may be identified by a reference numeral 46 on the front face of the turret member so that the operator can readily recognize the various stops by number. In practice, the numbered stops may be used in the same numerical sequence as the operations to be performed. Thus, the number of each stop designates the number of the operation for which the stop is used.

When a particular stop is desired to be used, the turret member is rotated to place that stop in a horizontal position and extending toward the right, so that the stop is in position to engage a lathe carriage which travels along the bed toward the left. In order to quickly and accurately locate the horizontal position of the stops, the rear face of the turret member is provided with equidistantly circumferentially spaced index detents or recesses 47, which are in line with the longitudinal axes of the stops, and an index pin 48 is mounted in the body 11 and is urged outwardly by a spring 49. The pin 48 is positioned to extend into one of the recesses 47 and lock the turret member against accidental rotative movement when one of the stops is in its desired horizontally extending position.

In operation, the work may be secured in the lathe chuck, and the attachment 10 is clamped to the bed of the lathe at a predetermined position with respect to the work. The lathe, for example, may be a manually operable screw cutting lathe, and it may be desired to perform a series of operations comprising center drilling, drilling or boring, spot facing and tapping or threading. The tools for performing these operations are mounted on the carriage in a suitable manner to permit them to be selectively applied to the work.

In order to perform each of the several operations, the carriage must be moved to a different final position in each case. To accomplish this the stops 14 of the attachment are adjusted to be engaged by the apron of the lathe carriage and to thereby stop the lathe carriage when it has reached its desired final position. For example, stops one (1), two (2), three (3), and four (4), may be adjusted to respectively stop the lathe carriage after center drilling, drilling, spot facing and tapping operations have been completed.

The lathe may now be operated to rotate the work and the feed screw may be manually operated to move the carriage and bring the tools thereon into cutting relation with the work. As each operation is completed, the stop for that operation prevents further movement of the lathe. Once the stops have been adjusted to perform a sequence of operations, the cycle may be repeated on succeeding work pieces to duplicate the operations and the articles resulting therefrom.

The attachment may also be used in connection with screw cutting lathes having a power driven feed screw for moving the carriage and means provided on the apron of the carriage adapted to be operated by the stops of the attachment to render effective devices for releasing the carriage from the feed screw, whereby the carriage stops.

From the foregoing description it will be seen that the present invention provides a simple, inexpensive lathe attachment for selectively stopping the lathe carriage at predetermined points so that a number of tools can be used in sequence to perform various operations on the work. The attachment can be easily secured on the lathe and the stops can be readily and accurately adjusted. The stops are effectively retained in their adjusted position, and enable the cycle of operation to be repeated to duplicate the articles being fabricated. The attachment, in this manner, converts lathes which require constant manual supervision into semi-automatic production type lathes. The attachment enables single purpose hand operated lathes to be used as "multipurpose" lathes. The attachments are rugged in construction and can readily withstand any rough usage to which they may be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. In a lathe attachment of the class described, the combination of a body member, a member rotatably mounted on said body member, and a series of stops projecting radially from said rotatable member, each of said stops including a sleeve member adjustably threaded into said rotatable member, a screw member adjustably threaded into said sleeve member, means for locking said sleeve member in adjusted position with respect to said rotatable member, means for locking said screw member in adjusted position with respect to said sleeve member, and resilient latching means carried by the said body member and adapted to engage said rotatable member to lock the same against accidental rotative movement relative to said body member.

2. In a lathe attachment of the class described, the combination of a body member, a member rotatably mounted on said body member, and a series of stops projecting radially from said rotatable member, each of said stops including a screw threaded sleeve member adapted to be adjustably telescoped into said rotatable member and a second screw threaded member adapted to be adjustably telescoped into said sleeve member, the pitch of the thread between said sleeve member and said second member being different than the pitch of the thread between said sleeve member and said rotatable member.

3. In a lathe attachment of the class described, the combination of a body member; a turret member rotatably mounted on said body member and having a series of radially projecting arms provided with a screw threaded bore; a stop for each of said arms; each of said stops including a screw threaded sleeve member adapted to be adjustably threaded into an arm of said rotatable member, a screw member adapted to be adjustably threaded into said sleeve member, a lock nut on said sleeve member for locking said sleeve member in adjusted position with respect to an arm of said turret, and a lock nut on said screw member for locking said screw member in adjusted position with respect to said sleeve member; and index means adjacent the center of said turret member adapted to be utilized in measuring the distance said stops project out of said arms.

4. In a lathe attachment of the class described, the combination of a body member, a turret member rotatably mounted on said body member and having a series of radially projecting arms provided with a screw threaded bore; and a stop for each of said arms; each of said stops including a screw threaded sleeve member adapted to be adjustably threaded into an arm of said rotatable member, a screw member adapted to be adjustably threaded into said sleeve member, a lock nut on said sleeve member for locking said sleeve member in adjusted position with respect to an arm of said turret, a lock nut on said screw member for locking said screw member in adjusted position with respect to said sleeve member, and index means provided adjacent the center of said turret member having surfaces each perpendicular to the longitudinal axis of each of said stops and adapted to be utilized in measuring the distance said stops project from said turret.

5. In a lathe attachment of the class described, the combination of a body member having a pair of clamping jaws for removably attaching said body member to a lathe, a member rotatably mounted on said body member and having a plurality of integral radially projecting arms each provided with a screw threaded bore, a screw threaded sleeve adapted to be adjustably threaded into said bore, a lock nut for retaining said sleeve member in adjusted position with respect to said arms, a screw threaded stop member adapted to be adjustably threaded into said sleeve, and a lock nut for retaining said stop member in adjusted position in said sleeve.

6. In a lathe attachment of the class described, the combination of a body member having a pair of clamping jaws for removably attaching said body member to a lathe, a member rotatably mounted on said body member having a plurality of radially extending screw threaded bores, screw threaded sleeves adapted to be adjustably threaded into each of said bores respectively, a lock nut for retaining said sleeves in adjusted position with respect to said bores, screw threaded stop members adapted to be adjustably threaded into each of said sleeves respectively, and a lock nut for retaining said stop members in adjusted position in said sleeves.

7. In a lathe attachment of the class described, the combination of a body member having a pair of clamping jaws for removably attaching said body member to a lathe, a member rotatably mounted on said body member having a plurality of radially extending screw threaded bores, screw threaded sleeves adapted to be adjustably threaded into each of said bores respectively and each having a portion extending radially outwardly therefrom, exteriorly accessible means for retaining said sleeves in adjusted position with respect to said bores, screw threaded stop members adapted to be adjustably threaded into each of said sleeves respectively and each having a portion extending radially outwardly therefrom, and exteriorly accessible means for retaining said stop members in adjusted position with respect to said sleeves.

JOHN A. HONEGGER.